United States Patent [19]

Fregnan

[11] Patent Number: 4,645,132
[45] Date of Patent: Feb. 24, 1987

[54] METHOD OF AND A MACHINE FOR THE MEASURING OUT OF GROUND MATERIAL

[75] Inventor: Florindo Fregnan, Dosson, Italy

[73] Assignee: Fregnan Florindo Costruzioni Macchine de Caffe "Elektra", Dosson, Italy

[21] Appl. No.: 722,888

[22] Filed: Apr. 12, 1985

[30] Foreign Application Priority Data

Apr. 12, 1984 [IT] Italy .................................. 3420 A/84

[51] Int. Cl.⁴ ............................................. B02C 25/00
[52] U.S. Cl. ...................................... 241/30; 241/36; 241/101.2
[58] Field of Search ............... 241/30, 36, 100, 101.2, 241/101.3, 101.5; 99/286, 287, 289 R

[56] References Cited

U.S. PATENT DOCUMENTS

| | | | |
|---|---|---|---|
| 2,560,826 | 7/1951 | Schuhmann | 241/100 X |
| 2,691,338 | 10/1954 | Robbins | 241/101.2 X |
| 2,699,899 | 1/1955 | Dale | 241/100 |
| 2,868,109 | 1/1959 | Davis | 241/36 X |
| 3,589,276 | 6/1971 | Swallert | 241/101.2 X |
| 4,007,675 | 2/1977 | Cailliot et al. | 241/36 X |

FOREIGN PATENT DOCUMENTS 613031 11/1960 Italy .................................... 241/100

*Primary Examiner*—Mark Rosenbaum
*Attorney, Agent, or Firm*—Karl F. Ross; Herbert Dubno

[57] ABSTRACT

A method of and a machine for measuring out of ground material, in particular coffee, of which the grains and beans are first of all ground and during the course of the grinding are deposited in a pre-measurement chamber. In this chamber, a piston transfers and packs the measure that is to be used, and variations in the preset measure are corrected.

3 Claims, 1 Drawing Figure

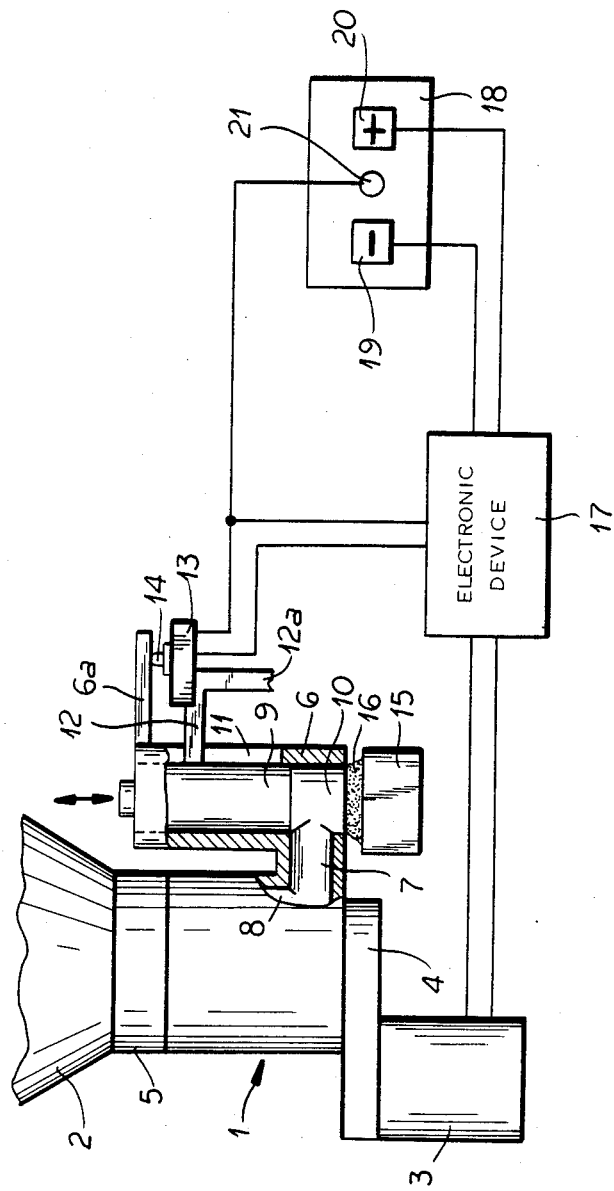

METHOD OF AND A MACHINE FOR THE MEASURING OUT OF GROUND MATERIAL

FIELD OF THE INVENTION

The present invention relates to a method of and a machine for the measuring out of ground material.

BACKGROUND OF THE INVENTION

As is well known, certain ground materials lose intrinsic qualities, such as fragrance, unless they are used immediately after grinding. As a result, the product formed from their use may prove to be of poor quality. This appies, for example, to socalled espresso coffee or coffee cream made from ground or powdered coffee.

As is also well-known, the coffee beans are in fact usually ground just prior to the preparation of espresso coffee or coffee cream for consumption, but not in the exact quantities or measures required. As a result, when the ground coffee remaining is eventually used, the espresso coffee or coffee cream prepared is of poor quality.

OBJECTS OF THE INVENTION

The principal object of this invention is to avoid the above-mentioned drawback represented by the aging of the residual ground material prior to its use and to provide a method and machine that can supply a preset measure of ground material at the moment in which it is to be used.

Another object of this invention is to provide a method and a machine which, while complying with the previously mentioned goal, ensure that the measure of ground material is forced directly from the grinding to the packing phase.

A further object of this invention is to provide a method and a machine which make it possible to vary grinding time in accordance with variations in grain-size and environment.

It is also an object of this invention is to provide a method and a machine which can be operated simply and economically.

SUMMARY OF THE INVENTION

The method of the invention comprises, in a first step, grinding the coffee beans. During the course of this first step, the resulting ground coffee is directly transferred into a pre-measurement chamber. In this chamber, there is a small piston which, in the second step, transfers and presses the measure of coffee to be used and also signals any variations in the preset measure. This presetting may be adjusted by a command that alters the grinding time of the first step.

The machine includes a coffee grinder and a ground coffee packing piston that forms the required measure. According to the invention, the piston defines and operates within a pre-measurement chamber. This chamber communicates directly with the grinding chamber of the coffee grinder and so receives the ground coffee that is directly transferred therefrom. The small piston is linked to commands that control the transfer and packing of the coffee measure and, in its turn, controls cyclically means for programming the preset measure. The piston, furthermore, signals variations in the said preset amount and by means of commands controlling the coffee grinder alters the programming of the said coffee grinders grinding time.

BRIEF DESCRIPTION OF THE DRAWING

Further features and benefits of the method and machine envisaged by this invention will become much clearer from the detailed description that follows of a particular preferred though not exclusive form that they can take in practice. This version is illustrated for the sake of example only and is not intended to limit the invention to the accompanying drawing, the sole FIGURE of which is a schematic presentation of the machine in its functional-mechanical-electrical aspects.

SPECIFIC DESCRIPTION

The method of the present invention consists in grinding the product, for example coffee beans, and then transferring the ground coffee thus obtained directly into a pre-measurement chamber during the very course of the grinding operation. The ground material is then transferred from the pre-measurement chamber, with the aid of a small piston, into the measurement area. There, the said piston packs the measure coffee, thus preparing it for use.

The quantity of ground material for the measure desired is preset by an electronic device of a well-known kind. This receives a first signal from the cyclic packing action of the aforesaid piston regarding any variations in the amount of ground material present with respect to the preset measure.

At the same time as this first signal, as a result of the packing action of the piston, a signal is also sent to the visual or acoustic indicators of a command device which, in the case illustrated is operated manually. Thus, operating in conformity with the indications received by the said indicators with the said signal on the said command device, a second signal is emitted by this command device, also in input, to the aforesaid electronic device. This electronic circuit device then proceeds to emit, in output, a command signal that has the task of resetting cyclically variations in grinding detected, thus altering as a result grinding times.

The schematically shown machine includes a coffee grinder 1, of the usual kind, a hopper 2 containing the coffee beans to be ground, a geared motor 3 and 4 that operates the grinding parts which are not visible in the FIGURE. There is also the traditional system 5 for adjusting the grinding parts so as to determine the grain size that one wishes to obtain.

Alongside the said coffee grinder 1, with its axis parallel to the vertical axis of the said coffee grinder, there is, connected to the body of the coffee grinder itself, a cylindrical body 6 the lower part of which is in communication with the coffee grinding chamber 8 of the coffee grinder by means of conduit 7.

In the cylindrical body 6, engaged with a sliding movement that is commanded alternately in a known way, there is a small piston 9 that defines a pre-measurement chamber 10, in the lower part of the said cylindrical body 6, alongside the aforesaid conduit 7 which is in communication with the grinding chamber 8.

The small piston 9 has the task of transferring and packing the measure of ground coffee to be used, as will be seen in greater detail in the following.

The cylinder body 6 has a slit 11 in which a radial arm element 12 joined to the piston 9 moves back and forth.

A microswitch 13 is supported in a fixed position by the radial arm element 12. The microswitch's operating part 14 comes into contact with a projecting part 6a that is presented above and radially from the said small piston 9. The radial arm element 12 has a part 12a that is elongated downwards for functions that do not relate to the invention under consideration.

The machine also includes, beneath the packing piston 9, an element 15 designed to collect and hold the ground material 16 that is to be packed, which constitutes the measure that is to be used in accordance with known methods. In the present invention, this is combined with an electronic device 17 of known kind for establishing the present measurement amount. This will be seen more clearly in the following. Also combined with these elements, there is a command device 18 that is manually operated by means of pushbuttons 19 and 20, on which the minus and plus signs respectively are marked, and which is fitted with a warning light 21, the function of which will be clarified below.

The electronic circuits device 17 is linked with first inputs to microswitch 13, with second inputs to pushbutton minus 19 and pushbutton plus 20 and with outputs to the aforesaid gear motor 3. The said microswitch 13 is also connected to the aforesaid warning light 21.

With a machine structured in this way, in accordance with the invention, it is possible to provide in cyclical succession a series of measures that can be preset independently of the variations in parameters relating to grain size or environment, by adjusting grinding time.

Thus having set the amount of ground coffee for the measure required in the electronic circuits device 17 and having started up the geared motor 3, 4 of the coffee grinder 1, the ground material is forced from the grinding chamber 8 through the conduit 7 and into the pre-measurement chamber 10. In the pre-measurement chamber 10 is located the small piston 9 which operates cyclically with alternate motion to pack the ground coffee, inside the collection element 15.

If the volume of the ground coffee packed into the said collection element 15 manifests variations with respect to the amount desired and preset by the electronic circuits device 17, these variations are detected by the packing piston 9 stroke, during its packing action, and are transmitted to the microswitch 13, the activating part 14 of which may come into contact with the fixed projecting part 6a in such a way as to send a corresponding first signal to a first input of the electronic circuits device 17 and a signal to the warning light 21 of the command device 18.

Following this, having detected the kind of signal that has been emitted, the operator will proceed to activate the corresponding pushbutton minus 19 or 20, thus sending a second signal to a second input of the same electronic circuits device 17, which, in its turn, proceeds to emit a corresponding signal to the gear motor 3, 4, altering appropriately the grinding time of the coffee grinder 1, and thus cyclically adjusting the measures, by resetting them in accordance with the previous setting on the same electronic circuit device 17.

The description of the method and of the machine in question, with reference to the FIGURE attached, has obviously only been given for the sake of an example and it is therefore quite apparent that both the method and the machine may be modified and altered in any way suggested by practical experience and by their production and use or employment, without changing of course the aspect according to which variations in the preset measure resulting from variations in grain size and environmental parameters are restored cyclically by adjusting grinding time.

I claim:

1. A method of preparing precisely metered quantities of a foodstuff, comprising the steps of:
   (a) grinding said foodstuff in a grinding chamber and directly transferring ground material to a metering chamber adjacent said grinding chamber;
   (b) compacting said ground material in said metering chamber into unit quantities of predetermined volume by reciprocating a piston in said metering chamber;
   (c) monitoring the displacement of said piston during reciprocation thereof and detecting a deviation of the compaction stroke of said piston representing deviation of the actual unit volume from a predetermined volume;
   (d) signalling said deviation; and
   (e) controlling the grinding time in step (a) in response to signals of deviation in step (d) to restore said actual volume to said predetermined volume.

2. An apparatus for preparing precisely metered quantities of a foodstuff, comprising:
   a grinder for grinding said foodstuff in a grinding chamber and directly transferring ground material to a metering chamber adjacent said grinding chamber;
   means for compacting said ground material in said metering chamber into unit quantities of predetermined volume by reciprocating a piston in said metering chamber;
   programming means for controlling said compacting means to establish said predetermined volume;
   means connected to said programming means for monitoring the displacement of said piston during reciprocation thereof and detecting a deviation of the compaction stroke of said piston representing deviation of the actual unit volume from a predetermined volume for signalling said deviation to said programming means; and
   means connected to said programming means for controlling the grinding time of said grinder in response to signals of deviation to restore said actual volume to said predetermined volume.

3. The apparatus defined in claim 2 wherein the last mentioned means includes push buttons connected to said programming means for controlling said grinding time.

* * * * *